United States Patent [19]

Sieberkrob et al.

[11] Patent Number: 4,502,189
[45] Date of Patent: Mar. 5, 1985

[54] COUPLING WITH OUTRIGGER PARTS

[75] Inventors: James Sieberkrob, Erie; Leo Campbell, Union City, both of Pa.

[73] Assignee: Morris Coupling Company, Erie, Pa.

[21] Appl. No.: 390,264

[22] Filed: Jun. 21, 1982

[51] Int. Cl.³ .................... F16L 21/06; F16L 55/16
[52] U.S. Cl. ........................ 24/279; 285/114; 285/373; 285/419; 285/424; 138/99
[58] Field of Search ............... 285/419, 373, 424, 114; 138/99; 24/279

[56] References Cited

U.S. PATENT DOCUMENTS

| | | | |
|---|---|---|---|
| 1,554,326 | 9/1925 | Black | 244/123 |
| 2,127,456 | 8/1938 | Adams | 138/99 |
| 2,748,803 | 6/1956 | Guarnaschelli | 285/114 X |
| 3,530,898 | 9/1970 | Wilson | 285/381 X |
| 3,914,833 | 10/1975 | Dunmire | 24/279 |
| 4,083,599 | 4/1978 | Gaffney | 248/393 X |
| 4,142,743 | 3/1979 | McGowen et al. | 285/424 X |

FOREIGN PATENT DOCUMENTS

| | | | |
|---|---|---|---|
| 403414 | 6/1966 | Switzerland | 285/114 |
| 2012385 | 7/1979 | United Kingdom | 285/114 |

Primary Examiner—Dave W. Arola
Attorney, Agent, or Firm—Charles L. Lovercheck; Wayne L. Lovercheck; Dale R. Lovercheck

[57] ABSTRACT

A coupling for pipe or the like made up of a plurality of spaced generally hollow cylindrical bodies made of sheet material and each having their adjacent ends bent back on themselves forming a pocket along each edge, an outrigger bar extends through the pocket on one edge of each of the bodies and a short bar extends through the pocket on the outer edge of each body. The short bars are connected to the outrigger by means of bolts and a flexible liner is supported inside each of the bodies forming a gasket for surrounding a pipe extending through the bodies. In the second embodiment a basic difference is that the couplings are made up of clamps or outrigger clamps at two halves rather than in a single band.

3 Claims, 5 Drawing Figures

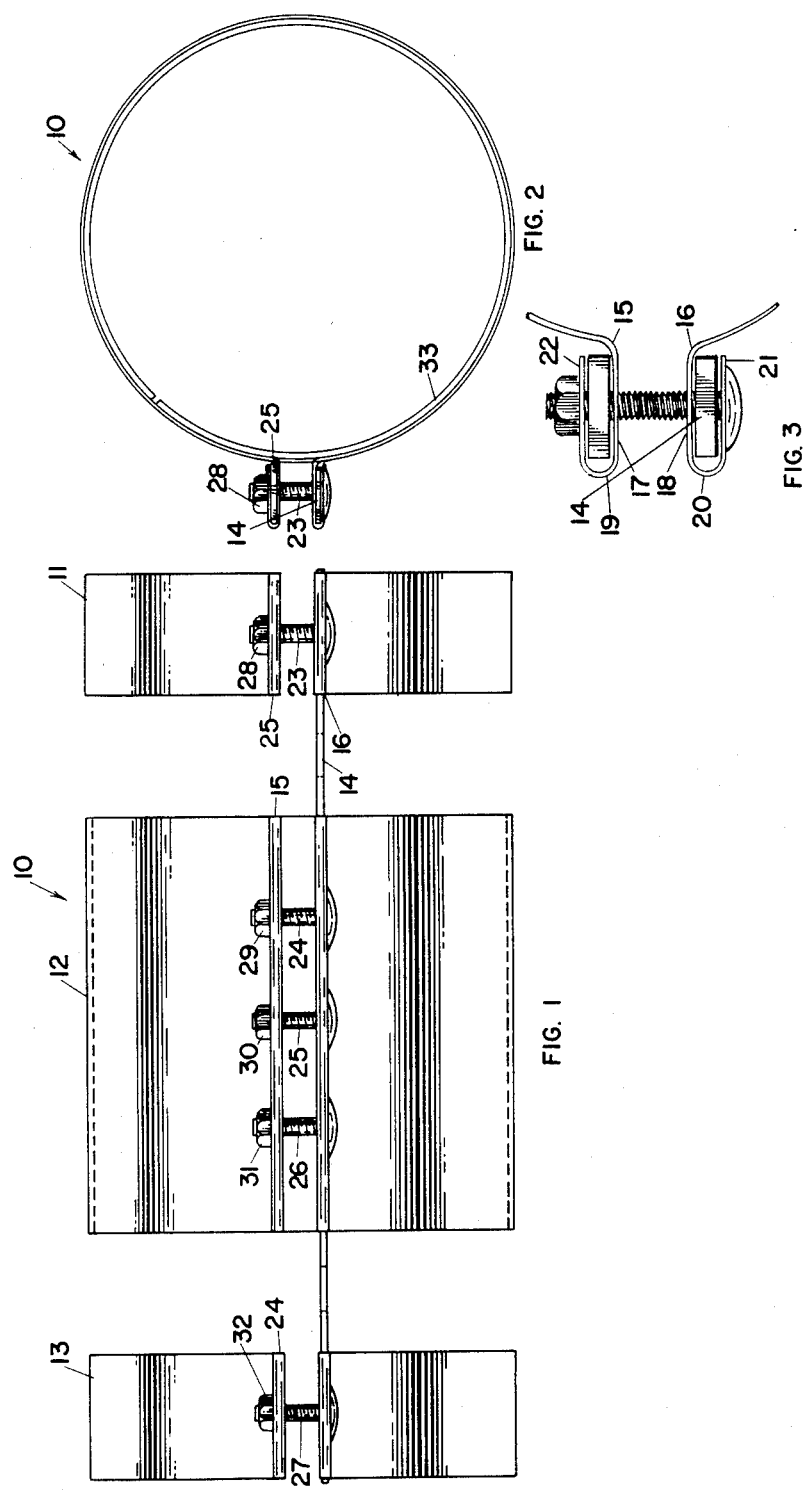

COUPLING WITH OUTRIGGER PARTS

GENERAL DESCRIPTION OF INVENTION

A coupling for pipe made up of spaced clamps connected by outrigger bars is disclosed. The outrigger bars hold the clamps in spaced relation to each other so that they can be placed around a pipe at spaced locations and held at uniform spacings from each other by the outrigger. The clamps are made of flexible metal and attached together by bolts. A sheet of resilient material is placed between the clamp and the pipe body.

REFERENCE TO PRIOR ART

Applicant is aware of the following Patents: U.S. Pat. No. 3,914,833, U.S. Pat. No. 3,530,898, and U.S. Pat. No. 2,127,456. These Patents show various types of couplers but do not show couplers spaced from each other by means of an outrigger such as those shown in the present disclosure.

OBJECTS OF THE INVENTION

It is an object of the invention to provide a coupling member made up of spaced clamps that are held in spaced relation to each other by an outrigger bar that is attached to each of the clamps.

Another object of the invention is to provide a coupling for pipe and the like that is simple in construction, economical to manufacture and simple and efficient to use.

Another object is to provide a coupling for pipe wherein clamps are held in spaced relation by spacer bars.

Another object is to provide a coupling for pipe wherein several clamps are connected by an outrigger bar.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention. cl GENERAL DESCRIPTION OF THE DRAWINGS FIG. 1 is a side view of a coupling according to the invention.

FIG. 2 is an end view of the coupler shown in FIG. 1.

FIG. 3 is an enlarged partial view of one of the clamp ends.

DETAILED DESCRIPTION OF INVENTION

Figure 5:
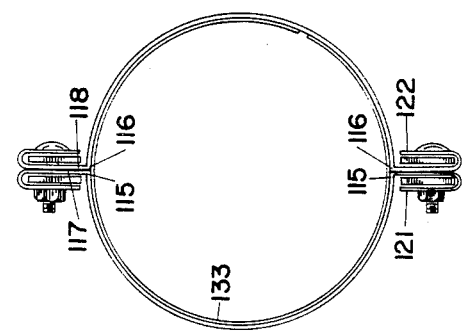
FIG. 5 is another view of the coupler shown in FIG. 4.

Now with more particular reference to the drawing, I show a coupler 10 for use on pipe or the like made up of a first clamp 11, a second clamp 12 and a third clamp 13 that are held in spaced relation to each other by an outrigger bar 14. The clamps are each made of a sheet of thin material which may be metal such as steel or the like that terminates in a first end 15 and a second end 16. The ends 15 and 16 are each bent outward forming a first radially extending part 17 and a second radially extending part 18. The ends of parts 17 and 18 are bent back on themselves forming a first arcuate intermediate part 19 and a second arcuate intermediate part 20 connected to second radially extending parts 21 and 22. The arcuate intermediate parts 19 and 20 connect the radially extending parts may be formed on a radius or they could be a square bend.

Holes are formed through the outrigger bar 14 and through the short bars 24 and 25 and the bolts 23, 24, 25, 26 and 27 each extend through the outrigger bar 14 and through the radially extending members that contain the bars 15 and nuts 28, 29, 30 and 31 are supported on the bolts 23–27 holding the clamps in clamped relation to each other.

Therefore, when the nuts 28 through 32 are all removed from the bolts 23–27, and bolts 23–27 are removed and the clamps 11, 12 and 13 are placed around a pipe with the resilient liners 33 in place the bolts 23–27 can be replaced and the nuts 28–32 tightened onto the bolts 23–27. The liner 33 will be compressed around the pipe clamping the line 33 into sealing engagement with the outside of the pipe.

Figure 4:
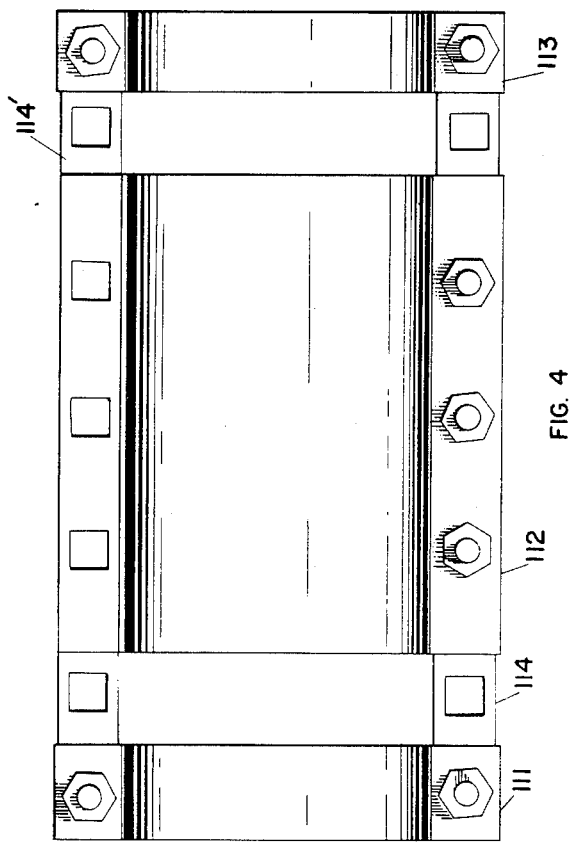
FIG. 4 is a top view of a coupler according to another embodiment of the invention.

In the embodiment of the invention shown in FIGS. 4 and 5 an embodiment of the invention is shown wherein the clamps 111, 112, and 113 are in two semicircular halves rather than in a single band. This enables the use of an additional outrigger bar 114 similar to outrigger bar 14 in the embodiment of FIGS. 1 and 2.

The ends ends of the two halves of each of the three clamps 111, 112 and 113 are each made of a single sheet of relatively rigid material formed into the shape of a half cylinder. Each of the half cylinders has an end portion that is formed like the ends at 15 and 16 of the clamp shown in FIG. 3. The ends at 115 and 116 are bent outwardly forming radially extending end portons 117 and 118 on each end of halves of clamps 111, 112 and 113 of FIGS. 4 and 5 are then bent back on themselves at 121 and 122 forming pockets for each of the outrigger bars 114 and 114 and second radially extending ends.

A liner 133 is placed inside the clamps as in the embodiment of FIGS. 1–3.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising a first clamp body,
a second clamp body,
said clamp bodies being made of a first flat piece of material and a second flat piece of material,
said flat pieces of material each having a first end and a second end and being curved into a general cylindrical shape,
first pockets formed on said first ends,
second pockets formed on said second ends,
an outrigger bar extending through said first pockets for holding said first clamp body and said second clamp body in spaced relation to each other,
a first bar means extending through said second pocket on said first clamp body,
said first bar means having a plurality of holes extending therethrough, a second bar means extending through said second pocket on said second clamp body, said second bar means having a plurality of holes extending therethrough, holes in said outrigger bar, holes in said pockets, and first bolts extending through said holes in said outrigger bar and said first pocket of said first clamp body and through said holes in said first bar means and said second pocket of said first clamp body, for clamping said first clamp body, second bolts extending through said holes in said first pocket of said second body, and said outrigger bar and through said holes in said second bar means and said second pocket of said second clamp body, for clamping said second body whereby said first body and said second body are held in spaced clamped relation from one another.

2. The coupling recited in claim 1 wherein a third clamp body is provided made of a third flat piece of material having a first end and a second end, a first pocket on said first end and a second pocket formed on said second end, holes in said first pocket, a third short bar, a hole in said second pocket, a hole in said third short bar, said outrigger bar extends through said first pocket of said third body and said third short bar extends through second pocket of said third body and third bolt means extends through holes in said said first pocket, outrigger bar, second pocket and said third short bar whereby said first clamp body, said second clamp body and said third clamp body are held in spaced clamped relation.

3. The coupling recited in claim 1 wherein said pockets are formed by bending said ends of said flat pieces of material outwardly generally perpendicular to said cylindrical shape, then bending said flat material back on itself about a radius thereby forming said pockets.

* * * * *